US011228516B1

(12) United States Patent
Harwani

(10) Patent No.: US 11,228,516 B1
(45) Date of Patent: Jan. 18, 2022

(54) EDGE COMPUTING MANAGEMENT USING MULTIPLE LATENCY OPTIONS

(71) Applicant: Amazon Technologies, Inc., Seattle, WA (US)

(72) Inventor: Robin Satish Harwani, Plano, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 158 days.

(21) Appl. No.: 16/138,729

(22) Filed: Sep. 21, 2018

(51) Int. Cl.
| | |
|---|---|
| *G06F 15/173* | (2006.01) |
| *H04L 12/26* | (2006.01) |
| *H04L 12/911* | (2013.01) |
| *H04L 29/08* | (2006.01) |

(52) U.S. Cl.
CPC ...... *H04L 43/0852* (2013.01); *H04L 43/0876* (2013.01); *H04L 47/70* (2013.01); *H04L 67/18* (2013.01)

(58) Field of Classification Search
CPC . H04L 43/0852; H04L 43/08; H04L 43/0858; H04L 43/0864; H04L 67/18; H04L 47/70; H04L 43/0876
See application file for complete search history.

(56) References Cited

U.S. PATENT DOCUMENTS

| | | | | |
|---|---|---|---|---|
| 8,321,862 | B2 * | 11/2012 | Swamy | G06F 9/455 |
| | | | | 718/1 |
| 10,116,521 | B2 * | 10/2018 | Kokkula | H04L 43/0876 |
| 2013/0219043 | A1 * | 8/2013 | Steiner | G06F 9/4856 |
| | | | | 709/224 |
| 2014/0244980 | A1 * | 8/2014 | Mortazavi | G06F 11/30 |
| | | | | 712/220 |
| 2014/0359129 | A1 * | 12/2014 | Sharma | H04L 67/10 |
| | | | | 709/226 |
| 2017/0295246 | A1 * | 10/2017 | Georgiou | H04L 67/148 |
| 2017/0359272 | A1 * | 12/2017 | Srinivasan | H04L 43/0876 |

* cited by examiner

*Primary Examiner* — Anh Nguyen
(74) *Attorney, Agent, or Firm* — Hogan Lovells US LLP

(57) ABSTRACT

Technology is described for edge computing management with multiple latency options. An application orchestration service may identify service distribution zones of a service provider environment that provide a connection between a mobile network and computing resources capable of executing portions of distributed applications used by devices connected to the mobile network. The application orchestration service may determine whether a network path latency between the devices and the computing resources satisfy latency constraints for the portions of the distributed applications. The application orchestration service may orchestrate which computing resources in the service distribution zones handle application processing by the portions of the distributed applications for the devices connected to the mobile network.

20 Claims, 11 Drawing Sheets

EDGE COMPUTING MANAGEMENT USING MULTIPLE LATENCY OPTIONS

BACKGROUND

Electronic devices and computing systems have become ever-present in many aspects of society. Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect, process and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

Advancements in communication technologies have allowed even relatively simple electronic devices to communicate with other devices and computing systems over a computer network. For example, the Internet of Things (IoT) is the interconnection of computing devices scattered across the globe, for example, using the existing Internet infrastructure. With the advent of high-speed communication technologies, such devices may be able to capture data, and then the devices may securely communicate the data quickly over a network to a centralized computing service in a service provider environment

DETAILED DESCRIPTION

Figure 1:
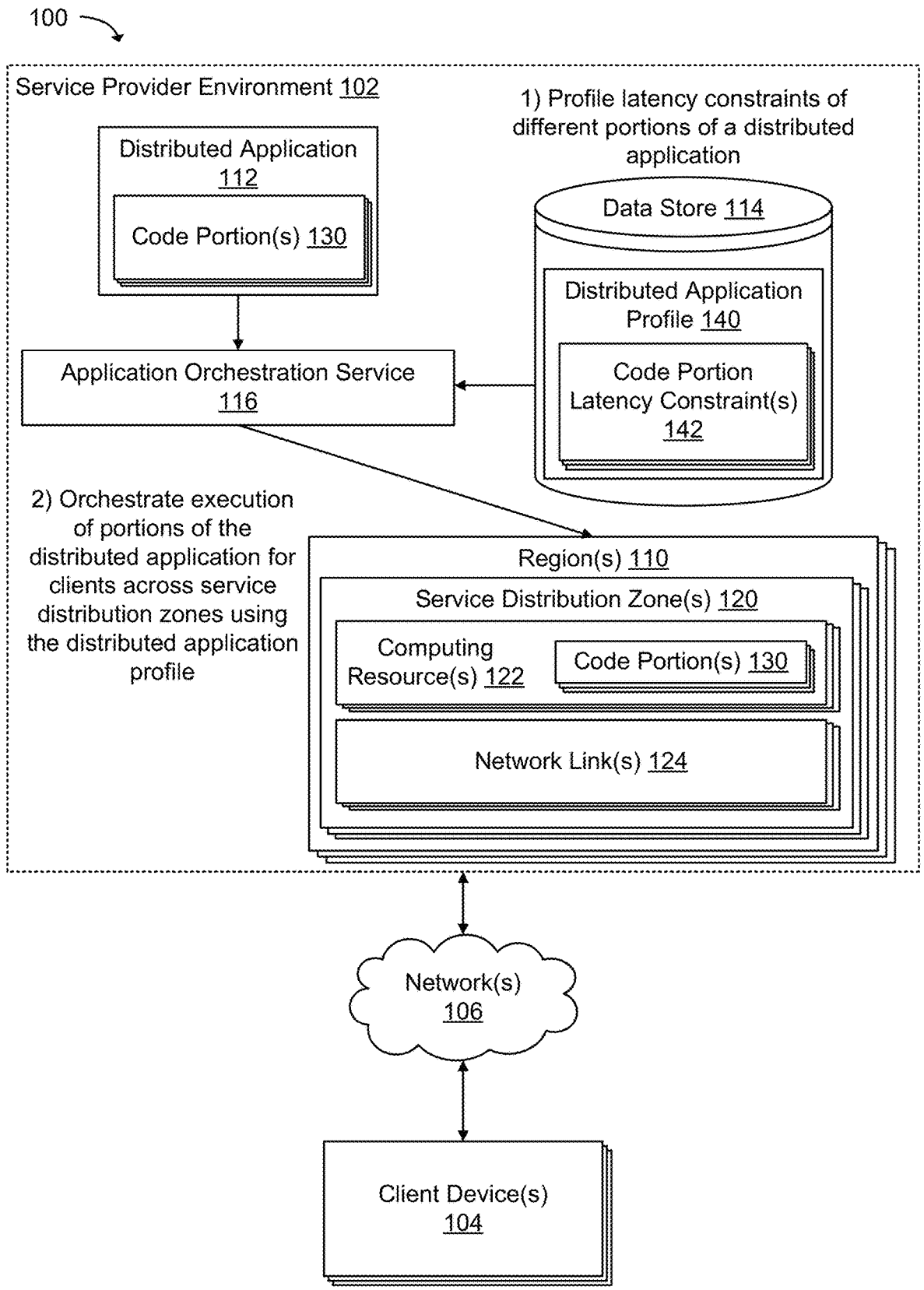
FIG. 1 illustrates a system and related operations for edge computing management using multiple latency options according to one example of the present technology.

A technology is described for edge computing management with multiple latency options or configurations. According to one example of the present technology, edge computing management may be provided in a service provider environment. The service provider environment may include one or more geographically separate regions at the edge of the network that provide fault tolerance and stability in terms of location, physical facilities, servers, networking, power, and other utilities. A region may include one or more isolated service distribution zones that have the ability to host computing resources and data at one or more of edge network locations. An edge network location may include one or more data centers or co-location facilities that provide physical facilities, racks and servers, network infrastructure, power and cooling, etc., to make computing resources, such as virtual computing instances, virtual private clouds, storage services, application services, etc., available to users of the service provider environment over one or more networks at various independent network latencies. A service distribution zone at a network location may include any number of racks, servers, or network connections that are connected to a variety of wired and wireless networks which are independent and isolated from other service distribution zones to provide redundancy and diverse processing resources.

As the service provider environment distributes data centers and utilizes co-location facilities to be physically closer to users, the service provider environment may extend the periphery of a centralized network to be closer in proximity to the users (e.g., near the network edge) and thereby provide reduced network path latencies between the users and the computing resources within a service distribution zone. Positioning computing resources at the network edge in close proximity to telecommunication providers or internet service providers (ISPs), such as providers of 5G mobile networks, may translate into better service for the users of the service provider environment. For example, a user may experience smoother, faster, and higher quality video transmission given the proximity of content to the user's location. In another example, applications having low-latency constraints for processing data may benefit from being executed closer to the user's location at an edge of the service provider environment, using a mid-point service distribution zone, a near-customer or near-client service distribution zone, or an in-customer or in-client service distribution zone. According to the present technology, the service provider environment may provide dynamic latency-based application orchestration across multiple service distribution zones using an application orchestration service.

According to one example of the present technology, a developer may create a distributed application that uses computing resources of the service provider environment. Execution of the distributed application may be orchestrated at various service distribution zones of the service provider environment using the application orchestration service. The developer may specify how different code portions of the distributed application tolerate or handle latency in communications to and from the code portions of the distributed application. For example, the developer may create an application profile specifying a latency constraint for code belonging to different portions of the distributed application. The application profile may provide a latency constraint for one or more different code functions, routines, modules, parts, processes, executables, etc. of the distributed application. A latency constraint for a code portion of the distributed application may indicate what latency to tolerate for connections between devices making requests to the distributed application and computing resources of the service provider environment providing application processing for the code portion of the distributed application. According to the present technology, the application orchestration service may utilize the application profile associated with the distributed application to orchestrate which computing resources in particular service distribution zones may be able to meet the constraints for application processing by the separate portions of the distributed application.

The application orchestration service may identify service distribution zones of the service provider environment that provide connections between devices and computing resources capable of executing code portions of the distributed applications to satisfy the latency constraints in the application profiles. The application orchestration service may monitor which computing resources in given service distribution zones may be allowed to execute application processing by different code portions of the distributed applications. The application orchestration service may migrate the application processing between service distribution zones as desired to meet the constraints. The application orchestration service may determine, for example, whether a network path latency between a device connected to a mobile network and a computing resource in a service distribution zone satisfies a latency constraint for a code portion of a distributed application used by the device. The application orchestration service may send the distributed application to the computing resource to execute application processing by the code portion of the distributed application within the service distribution zone in response to the network path latency satisfying the latency constraints for the code portion of the distributed application used by the device. The application orchestration service may send all of the distributed application or just the code portion of the distributed application for execution.

In another example, the application orchestration service may receive a change in the network location of a device using a code portion of the distributed application at a first service distribution zone of the service provider environment. The application orchestration service may identify a second service distribution zone of the service provider environment that provides a connection between the network path of the device and one or more computing resources in the second service distribution zone capable of executing the code portion of the application used by the device, while also meeting the constraints for the application. The application orchestration service may determine whether the change in the network location of the device results in a network path latency between the device and the one or more computing resources in the second service distribution zone that satisfies the latency constraint for the code portion of the application. The application orchestration service may migrate the application processing by the code portion of the application within the first service distribution zone to the one or more computing resources of the second service distribution zone in response to the new network path latency satisfying the latency constraint. Accordingly, the application orchestration service may determine whether to migrate application processing by a code portion of a distributed application within a first service distribution zone from one or more computing resources of the first service distribution zone to one or more computing resources of a second service distribution zone of the service provider environment when the network path latency changes.

According to one example of the present technology, the application orchestration service may determine whether to migrate application processing by a code portion of a distributed application within a first service distribution zone of the service provider environment to one or more computing resources of a second service distribution zone in response to a variety of conditions, such as when a transferred connection from a device is established, a network path latency changes, utilization of the code portion of the distributed application falls below a threshold, and the like. For example, the application orchestration service may migrate the application processing by the code portion of the application within the first service distribution zone from one or more computing resources in the first service distribution zone to one or more computing resources in the second service distribution zone in response to the connection from the device being established. According to another example of the present technology, the application orchestration service may send the code portion of the application to one or more additional computing resources in the same service distribution zone to execute, for the device, additional application processing by the code portion of the application within the service distribution zone.

The application orchestration service may orchestrate application processing for multiple distributed applications and for multiple devices. The application orchestration service may receive a network location in the mobile network of a second device in communication with the application hosted by the service provider environment. The application orchestration service may determine whether the network path latency between the second device and the computing resource in the identified service distribution zone satisfies the latency constraint for the code portion of the application. The application orchestration service may send the code portion of the application to the computing resource in the identified service distribution zone to execute, for the second device, application processing by the code portion of the application within the identified service distribution zone in response to the network path latency of the other device satisfying the latency constraint.

FIG. 1 illustrates a system 100 and related operations for edge computing management using multiple latency options according to one example of the present technology. The system 100 may include a service provider environment 102 and one or more client device(s) 104 in communication using one or more network(s) 106. The service provider environment 102 may be capable of delivery of computing and storage capacity, for example, as a service to a community of end recipients. In an example implementation, the service provider environment may be established for an organization by or on behalf of the organization. That is, the service provider environment 102 may offer a private computing environment (e.g., a private cloud environment). In another implementation, the service provider environment may support a multi-tenant environment, wherein a plurality of users each operates independently (i.e., a public cloud environment). The service provider environment 102 may employ virtualization that allows a single physical server computer to host multiple computing instances (e.g., virtual guest machines) using a hypervisor or another virtualization scheme. Each computing instance may be a guest machine acting as a distinct logical computing system. End users may access the service provider environment 102 using the networked client device(s) 104, such as server computers, desktop computers, laptops, tablets, smartphones, thin clients, automobiles, embedded devices, etc. running web browsers or other lightweight client applications.

The service provider environment 102 may include one or more region(s) 110, a distributed application 112, a data store 114, and an application orchestration service 116. The region(s) 110 may include physical or logical aggregations of computing resources within the service provider environment 102. For example, the region(s) 110 may include one or more geographically situated data centers, colocation facilities, and other physical computing locations within the service provider environment 102. In another example, the region(s) 110 may include computing resources geographically dispersed and connected using low-latency network links.

The region(s) 110 may include one or more service distribution zone(s) 120 that provide a set of services, such as compute services, storage services, networking services, content streaming services, high availability and redundancy services, and the like. The service distribution zone(s) 120 may include one or more computing resource(s) 122 and one or more network link(s) 124 mapped to or associated with an individual data center, colocation facility, or other physical computing location. The service distribution zone(s) 120 may isolate the computing resources from other service distribution zones within a given region, for example, with independent power, network connectivity, and the like. For example, the service distribution zone(s) 120 may be located with an individual company data center, leased colocation facility, computer rooms of telecommunication providers, warehouses, cell tower facilities, in data backbones, local telephone exchanges, wireless base stations (e.g., a base station rack in a cell phone environment), local computing hubs, in-client computing environments, etc.

The service distribution zone(s) 120 may provide ubiquity or universality in the set of services offered across the service distribution zone(s) 120 to the client device(s) 104. In other words, the set of services offered in a first of the service distribution zone(s) 120 may be similar to the set of services offered in a second of the service distribution zone(s) while the number, availability, capability, capacity, configuration, etc. of the computing resource(s) 122 in the first and second service distribution zones may differ. In addition, the service distribution zone(s) 120 may provide high availability and redundancy to the client device(s) 104 and across the service distribution zone(s). The service distribution zone(s) 120 may provide an average or typical latency between the computing resources and any externally connected networks using the network link(s) 124. Moreover, the service distribution zone(s) 120 may provide an average or typical latency by being geographically closer to the client device(s) 104 or providing low-latency links. The service distribution zone(s) 120 may be geographically located at one or more edges of the service provider environment 102 which are physically closer to the client device(s) 104 and/or the network(s) 106 than centralized computing services that are in a larger data center.

The service distribution zone(s) 120 may be used to balance the cost of bandwidth against the cost of providing the set of services at one or more edges of the service provider environment 102. The service provider environment 102 may place the service distribution zone(s) 120 at data centers, leased colocation facility, computer rooms of telecommunication providers, warehouses, mobile network sites, on premise with user devices, and the like, to balance or reduce bandwidth costs, operating costs, and the like. The service distribution zone(s) 120 may also provide residency of data within the service provider environment 102. The service provider environment 102 may place the service distribution zone(s) 120 closer to clients to move data closer to where it is used.

The service distribution zone(s) 120 may be hierarchical in nature and may include one or more mid-point service distribution zones, near-customer or near-client service distribution zones, and in-customer or in-client service distribution zones. A mid-point service distribution zone may include one or more of the service distribution zone(s) 120 geographically located closer to the client device(s) 104 and/or the network(s) 106 than the service distribution zone(s) 120 at core data centers of the service provider environment 102. The mid-point service distribution zones may be located at edges of the service provider environment 102 with a leased colocation facility, computer rooms of telecommunication providers, warehouses, and the like. One example of a mid-point service distribution zone may include a mid-point edge of the service provider environment 102 at a colocation facility. A near-customer or near-client service distribution zone may include one or more of the service distribution zone(s) 120 geographically that are located closer to the client device(s) 104 and/or the network (s) 106 than the mid-point service distribution zones of the service provider environment 102. The near-customer or near-client service distribution zones may be located at edges of the service provider environment 102 with a leased colocation facility, cell tower facilities, local telephone exchanges, wireless base stations, local computing hubs, on premise, at internet service providers, and other network locations that provider last-mile links. One example of a near-customer or near-client service distribution zone may include a near-customer edge of the service provider environment 102 integrated with a base station of a 5G network. In one illustrative example, the near-customer or near-client service distribution zones may be located within 100-200 miles of clients, have between 10-100 ms latency, and the like. An in-customer or in-client service distribution zone may include one or more of the service distribution zone(s) 120 geographically located closer to the client device(s) 104 and/or the network(s) 106 than the near-customer or near-client service distribution zones of the service provider environment 102. The in-customer or in-client service distribution zones may include or be located at edges of the service provider environment 102 in a network of a user or client, in client device(s) 104, etc. Some examples of an in-customer or in-client service distribution zone may include an in-customer edge of the service provider environment 102 in a Raspberry Pi or minicomputer located in a vehicle, in a bio-implantable device providing compute capabilities for monitored data, and the like.

A developer may create and deploy the distributed application 112 for execution using the computing resource(s) 122 within the service distribution zone(s) 120 of the region(s) 110. The distributed application 112 may include one or more code portion(s) 130. The code portion(s) 130 may include code blocks, functions, subroutines, code modules, and the like that may execute independently or in a distributed manner across the computing resource(s) 122 within the service distribution zone(s) 120 of the region(s) 110.

The developer may specify which of the region(s) 110 to use for execution of the application. The developer may manually designate which of the region(s) 110 to use, which of the service distribution zone(s) 120 to use, and which of the computing resource(s) 122 to use. According to the present technology, the developer may also enable dynamic edge computing management allowing the region(s) 110, the service distribution zone(s) 120, and the computing resource(s) 122 to be automatically identified and provisioned for application execution by profiling the latency constraints of the code portion(s) 130 of the distributed application 112. The developer may create a distributed application profile 140 to enable the code portion(s) 130 of the distributed application 112 to be dynamically assigned across the computing resource(s) 122 within the service distribution zone(s) 120 of the region(s) 110. The distributed application profile 140 may include one or more code portion latency constraint(s) 142. The code portion latency constraint(s) 142 may include a latency value, a latency range, an upper latency constraint, a lower latency constraint, a latency threshold, and the like that the code portion(s) 130 is desired to tolerate. Accordingly, the developer may profile the latency constraints for all or part of the distributed application 112.

According to the present technology, the application orchestration service 116 may dynamically match the code portion(s) 130 of the distributed application 112 to the computing resource(s) 122 within the service distribution zone(s) 120 of the region(s) 110 using the distributed application profile 140. The application orchestration service 116 may retrieve the distributed application profile 140 from the data store 114 and determine which of the computing resource(s) 122 within a given one of the service distribution zone(s) 120 of the region(s) 110 satisfies the code portion latency constraint(s) 142. The application orchestration service 116 may migrate the code portion(s) 130 between the service distribution zone(s) 120 in order to ensure that the code portion latency constraint(s) 142 are met.

Figure 2A:
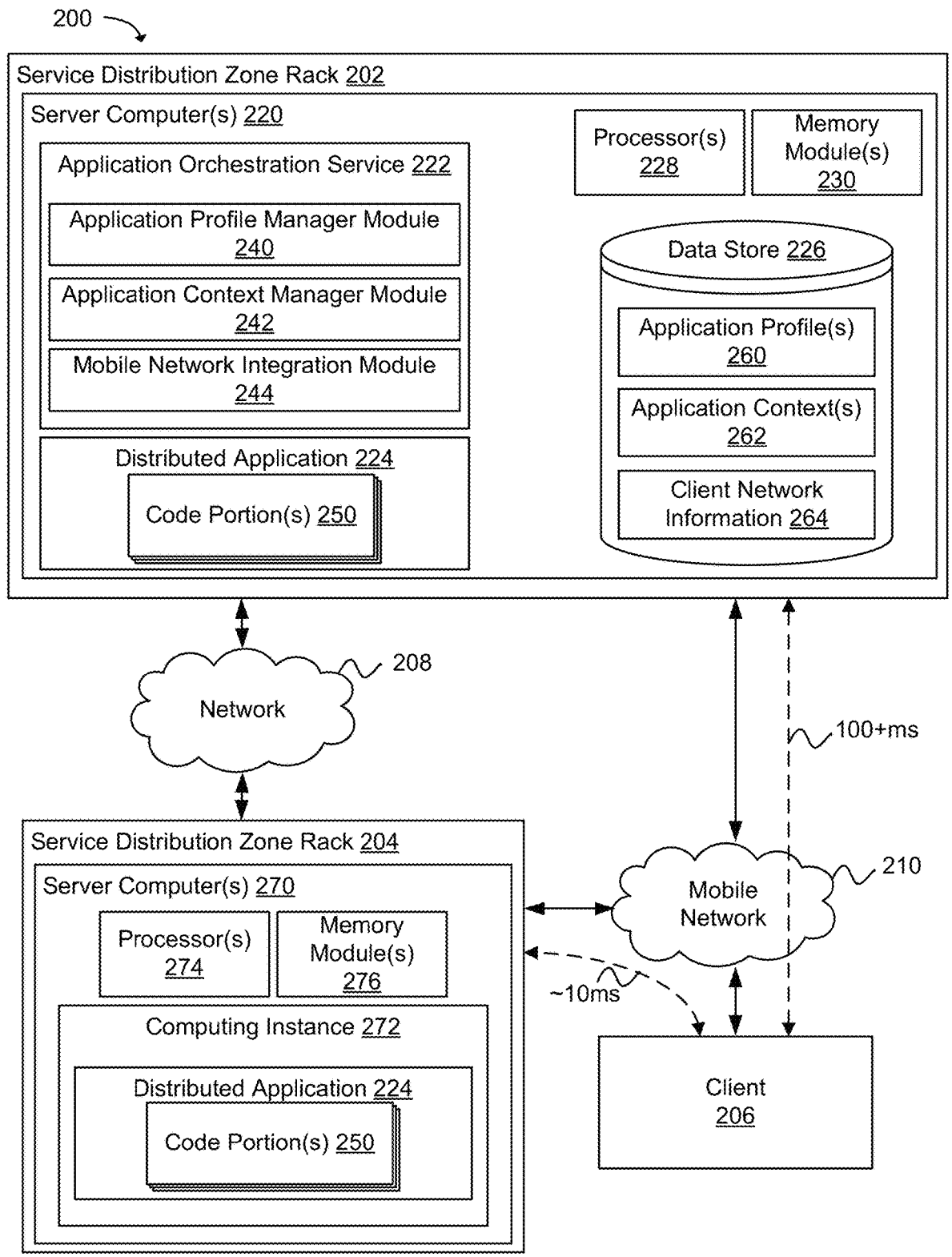
FIGS. 2A and 2B illustrate various example components included in a system for edge computing management across multiple service distribution zones according to one example of the present technology.
Figure 2B:
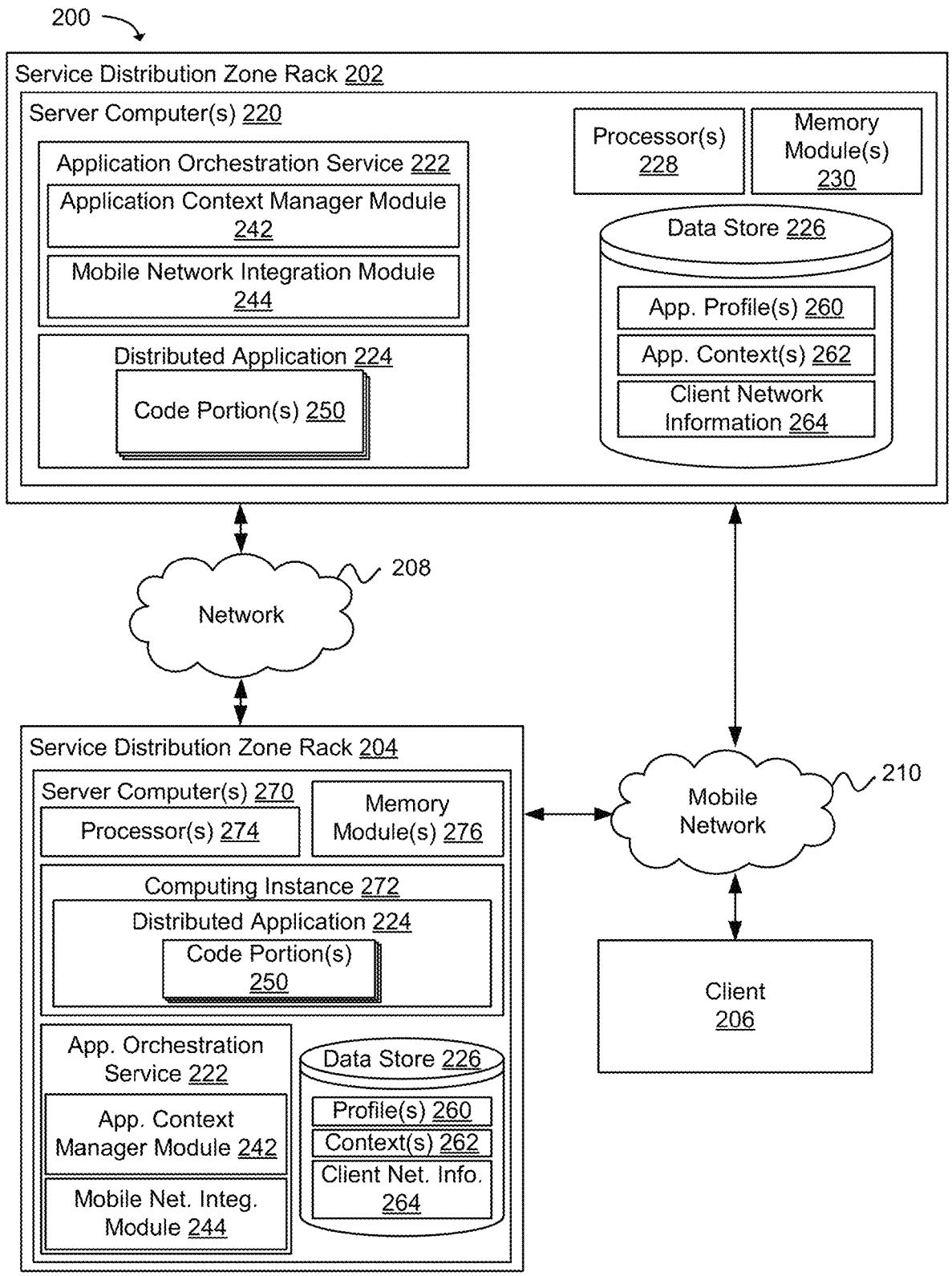

FIGS. 2A and 2B illustrate various example components included in a system 200 for edge computing management with multiple latency options according to one example of the present technology. The system 200 may include a first service distribution zone rack 202, a second service distribution zone rack 204, a client 206, a network 208, and a mobile network 210. The first service distribution zone rack 202 may be in communication with the second service distribution zone rack 204 using the network 208. The first service distribution zone rack 202 may be in communication with the client 206 using the mobile network 210. The second service distribution zone rack 204 may be in communication with the client 206 using the mobile network 210. The first service distribution zone rack 202 may include one or more server computer(s) 220. The server computer(s) 220 may include an application orchestration service 222, a distributed application 224, a data store 226, one or more processor(s) 228, and one or more memory module(s) 230.

The application orchestration service 222 may orchestrate the application lifecycle of the distributed application 224 across multiple service distribution zones. The application orchestration service 222 may determine where and when to execute the distributed application 224. For example, the application orchestration service 222 may send the distributed application 224 (or one or more of the code portion(s) 250) to the server computer(s) 220 for execution. In another example, the application orchestration service 222 may send the entire distributed application 224 (or one or more of the code portion(s) 250) to the server computer(s) 270 for execution. The application orchestration service 222 may start and stop the execution of the distributed application 224 (or one or more of the code portion(s) 250) at the server computer(s) 220 and 270. In addition, the application orchestration service 222 may migrate the execution of the distributed application 224 (or one or more of the code portion(s) 250) between the server computer(s) 220 and 270.

In the example of FIG. 2A, the application orchestration service 222 may centralize the orchestration of the application lifecycle of the distributed application 224 across service distribution zones. As illustrated, the application orchestration service 222 may include an application profile manager module 240, an application context manager module 242, and a mobile network integration module 244 hosted by the server computer(s) 220.

The application profile manager module 240 may receive information from a developer describing the different code portion(s) 250 of the distributed application 224. The application profile manager module 240 may create an application profile 260 for the distributed application 224 using latency constraints for one or more of the code portion(s) 250. The application profile manager module 240 may store the application profile in the data store 226 as one of the application profile(s) 260. The data store 226 may serve as an application profile registry.

Upon execution of the distributed application 224, the application orchestration service 222 may use the application profile manager module 240 to retrieve the application profile(s) 260 from the data store 226. The application orchestration service 222 may use the application profile(s) 260 to determine when and where to instantiate the code portion(s) 250 of the distributed application 224 in order to satisfy the latency constraints in the application profile(s) 260. The application orchestration service 222 may use the application profile(s) 260 to determine where to migrate the code portion(s) 250 of the distributed application between service distribution zones in order to ensure that the latency constraint remain satisfied.

The application orchestration service 222 may use the application context manager module 242 to monitor application processing by the code portion(s) 250 of the distributed application 224. The application context manager module 242 may track which computing resources are used by the code portion(s) 250 and store the information as one or more application context(s) in the data store 226. The application context manager module 242 may track application data associated with clients that is being used by the application processing by the code portion(s) 250 and store the information as the application context(s) 262 in the data store 226. The application orchestration service 222 may migrate the application processing performed by one or more of the code portion(s) 250 between service distribution zones using the application context(s) 262. For example, the application orchestration service 222 may, using the application context(s) 262, transfer application data used by the application processing by the code portion(s) 250 between computing resources at different service distribution zones. The application orchestration service 222 may retrieve or restore the application state from the application context(s) 262. In another example, the application orchestration service 222 may determine the location of the application from the application context(s) 262 and send an instruction to one or more computing resources at the determined location to transfer the data to another service distribution zone.

The application orchestration service 222 may use the mobile network integration module 244 to monitor the client 206 in the mobile network 210. For example, the mobile network integration module 244 may periodically query the mobile network 210 for a network location of the client 206. The network location may include a physical location, a logical location, a closest cell tower site identifier, and the like. The mobile network integration module 244 may also receive updates as to changes in the network location of the client 206. In addition, the mobile network integration module 244 may store the information about the client 206 in the data store 226 as client network information 264. In another example, the mobile network integration module 244 may monitor the network path latency of the client 206. The network path latency may include a communication latency between the client and a computing resource. The network path latency may also include processing latency that affects communication between the client and a computing resource.

The second service distribution zone rack 204 may include one or more server computer(s) 270. The server computer(s) 270 may include a computing instance 272, one or more processor(s) 274, and one or more memory module(s) 276. The computing instance 272 may include the distributed application 224. In this example, the application orchestration service 222 may cause the server computer(s) 220 to execute one or more of the application portion(s) of the distributed application 224 whose latency constraints are satisfied by the 100+ms connection between the first service distribution zone rack 202 and the client 206. The application orchestration service 222 may also cause the computing instance 272 to execute one or more of the code portion(s) 250 of the distributed application 224 whose latency constraints are satisfied by the ~10 ms connection between the service distribution zone rack 204 and the client 206.

In the example of FIG. 2B, the orchestration logic may itself be distributed across service distribution zones for orchestrating the application lifecycle of the distributed application 224. As illustrated, the server computer(s) 220 within the service distribution zone rack 202 may include at least part of the application orchestration service 222, with all or part of the application context manager module 242 and the mobile network integration module 244, as well as the data store 226, with all or part of the application profile(s) 262, the application context(s) 262, and the client network information 264. In addition, the server computer(s) 270 within the service distribution zone rack 204 may include at least part of the application orchestration service 222, with all or part of the application context manager module 242 and the mobile network integration module 244, as well as the data store 226, with all or part of the application profile(s) 262, the application context(s) 262, and the client network information 264. The server computer(s) 220 within the service distribution zone rack 202 and the server computer(s) 270 within the service distribution zone rack 204 may use all or part of the application orchestration service 222, individually or in combination, to orchestrate when and where to execute the code portion(s) 250 of the distributed application 224.

According to one example of the present technology, the orchestration logic may begin centralized, for example, at the server computer(s) 220 within the service distribution zone rack 202 and migrate to the server computer(s) 270 within the service distribution zone rack 204, and vice versa. According to another example of the present technology, the orchestration logic may be distributed to the client 206, for example, using an in-customer or in-client service distribution zone to orchestrate the application lifecycle of the distributed application 224 at the client 206.

The various processes and/or other functionality contained within the system 200 may be executed on one or more processor(s) 228 and 274 that are in communication with one or more memory module(s) 230 and 276. The system 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 226 may include storage systems such as a SAN (Storage Area Network), cloud storage network, volatile or non-volatile RAM, optical media, or hard-drive type media. The data store 226 may be representative of a plurality of data stores as can be appreciated.

The network 208 and the mobile network 210 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
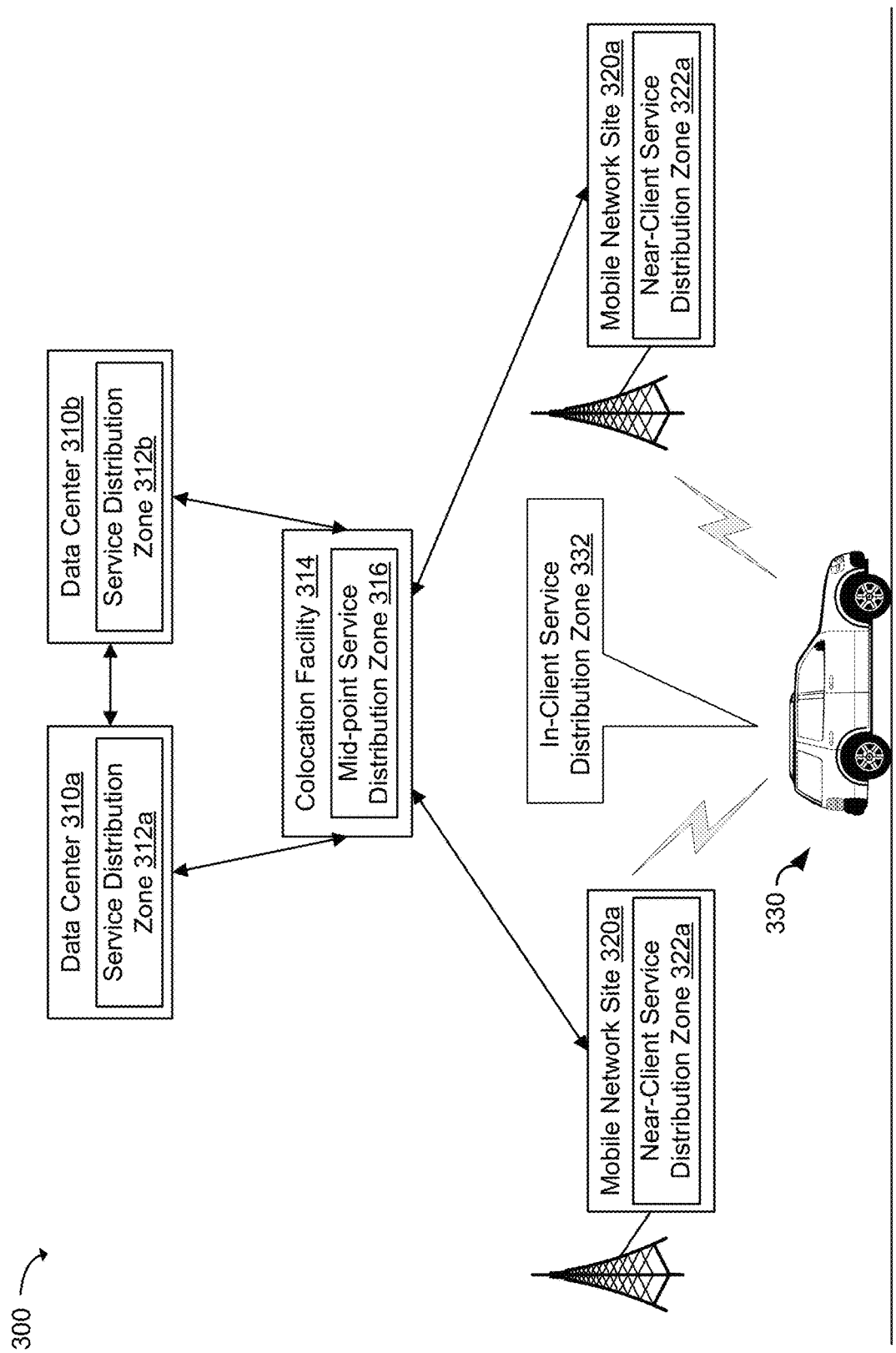
FIG. 3 illustrates a system and related operations for orchestrating application processing by portions of a distributed application used by a device connected to a mobile network across multiple networked service distribution zones according to one example of the present technology.

FIG. 3 illustrates a system 300 and related operations for orchestrating application processing by portions of a distributed application used by a device connected to a mobile network across multiple networked service distribution zones according to one example of the present technology. In this example, the system 300 may include one or more data centers, such as data centers 310a-310b, one or more colocation facilities, such as colocation facility 314, and one or more mobile network sites, such as mobile network sites 320a-320b. According to the present technology, an application orchestration service may utilize the data centers 310a-310b, the colocation facility 314, and the mobile network sites 320a-320b to execute application processing by portions of one or more distributed applications for a vehicle 330. The data centers 310a-310b, the colocation facility 314, and the mobile network sites 320a-320b may be interconnected using one or more low-latency network links. The data centers 310a-310b, the colocation facility 314, and the mobile network sites 320a-320b may also be connected to one or more external networks using one or more network links.

Each of the data centers 310a-310b, the colocation facility 314, and the mobile network sites 320a-320b may include a service distribution zone, such as a service distribution zone 312a associated with the data center 310a, a service distribution zone 312b associated with the data center 310b, a mid-point service distribution zone 316 associated with the colocation facility 314, a near-client service distribution zone 322a associated with the mobile network site 320a, a near-client service distribution zone 322b associated with the mobile network site 320b, and an in-client service distribution zone 322 associated with the vehicle 330. The service distribution zones 312a-312b, 316, and 322a-322b may provide computing resources accessible to the other data centers, external networks and the devices (e.g., mobile devices). The service distribution zones 312a-312b, 316, and 322a-322b may provide a service level guarantee as to the speed and latency of the connections to the other data centers and the external networks.

In this example, the colocation facility 314 is also connected to a mobile network at one or more mobile network sites, such as mobile network sites 320a and 320b. Each of the mobile network sites may include one or more service distribution zones, such as the near-client service distribution zone 322a associated with the mobile network site 320a and the near-client service distribution zone 322b associated with the mobile network site 320b. The near-client service distribution zones 322a and 322b may provide computing resources with a low-latency link to the mobile network. Devices, such as the vehicle 330 or a mobile device in the vehicle, may access the mobile network and utilize the computing resources of the near-client service distribution zones 322a and 322b.

According to the present technology, an application orchestration service may match portions of a distributed application used by the vehicle 330 to one or more of the service distribution zones 312a-312b, the mid-point service distribution zone 316, the near-client service distribution zones 322a and 322b, and the in-client service distribution zone 332. The application orchestration service may send one or more distributed applications (or portions thereof) to one or more computing resources of the service distribution zones 312a-312b, 316, 322a-322b, and 332 to execute, for the vehicle 330, application processing within the given service distribution zone. The application orchestration service may match each portion of the distributed application to a given service distribution zone according to whether the given service distribution zone satisfies the latency constraints of the corresponding portion of the distributed application. The application orchestration service may preload the service distribution zones 312a-312b, 316, 322a-322b, and 332 with the distributed application (or one or more portions therefor) to facilitate subsequent execution. Therefore, the application orchestration service may send an instruction to the service distribution zones 312a-312b, 316, 322a-322b, and 332 to handle execution.

In one example configuration, a first portion of a distributed application used by the vehicle 330 may collect and process usage information and metrics associated with vehicle operation and maintenance. A second portion of the distributed application used by the vehicle 330 may report traffic and accident information. A developer of the distributed application may specify that the first portion of the distributed application requires an average or typical latency of 100+ms for the collection and processing of the usage information and metrics. The developer may specify that the second portion of the distributed application requires an average or typical latency of 10 ms for the reporting of traffic and accident information. Thus, the application orchestration service may match the first portion of the distributed application to one or more of the service distribution zones 312a-312b and 316 according to whether the given service distribution zones satisfy the 100+ms latency constraint of the corresponding portion of the distributed application. The application orchestration service may match the second portion of the distributed application to one or more of the near-client service distribution zones 322a-322b and the in-client service distribution zone 332 according to whether the given service distribution zones satisfies the 10 ms latency constraint of the corresponding portion of the distributed application.

According to another example of the present technology, the application orchestration service may dynamically migrate portions of the distributed application between service distribution zones. During application execution, the application orchestration service may send an instruction to one or more computing resources of various service distribution zones to migrate, for the vehicle 330, the application processing for the first or second portions of the distributed application from one service distribution zone to another. For example, the application orchestration service may migrate the second portion of the distributed application from the near-client service distribution zone 322a to the near-client service distribution zone 322b according to whether the current service distribution zone satisfies the latency constraints of the second portion of the distributed application as the vehicle 330 travels. The application orchestration service may transfer application data associated with the vehicle 330 between the near-client service distribution zones 322a and 322b as the application processing by the second portion of the distributed application migrates from zone to zone.

Figure 4:
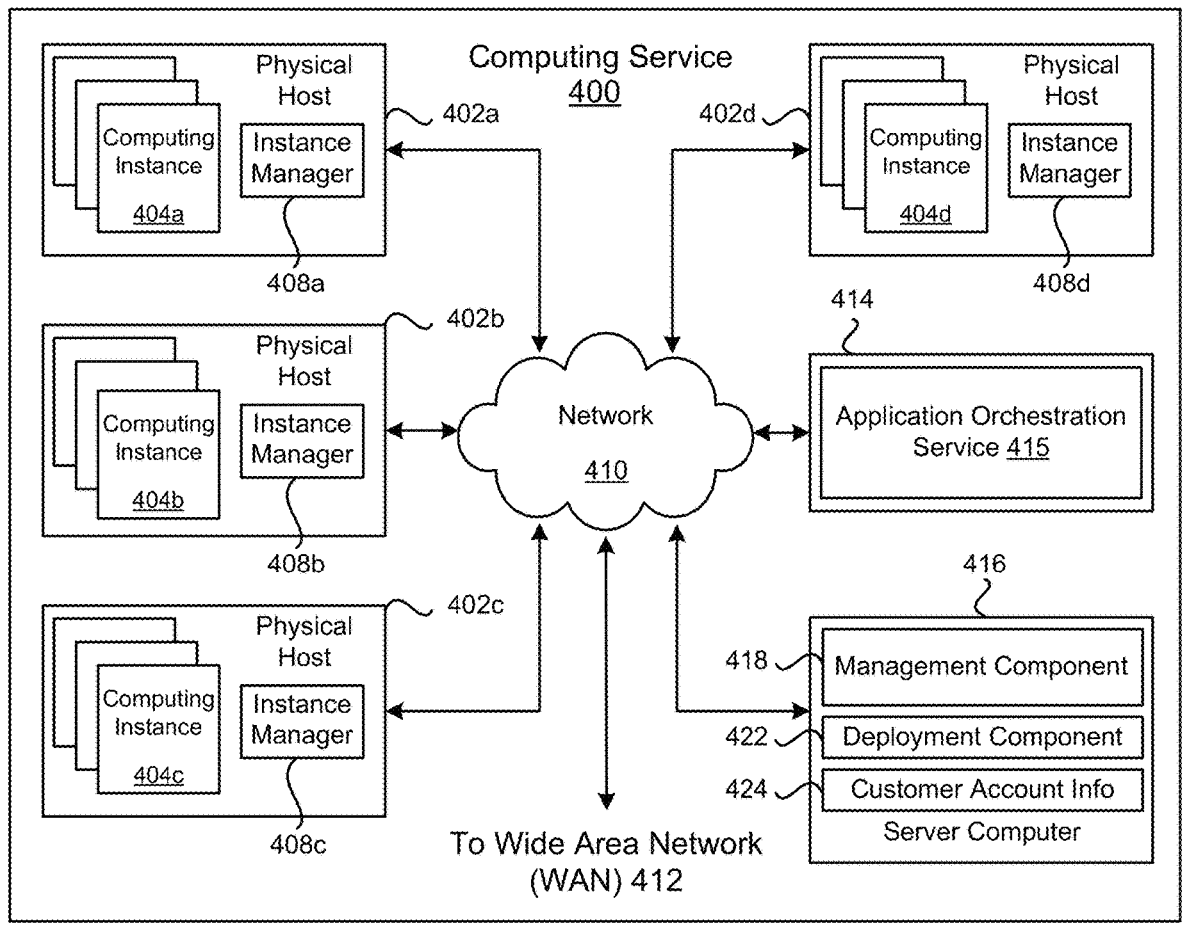
FIG. 4 is a block diagram that illustrates an example computing service that includes an application orchestration service for edge computing management across multiple service distribution zones according to one example of the present technology.

FIG. 4 is a block diagram that illustrates an example computing service that includes an application orchestration service according to one example of the present technology. The computing service 400 may be used to execute and manage a number of computing instances 404a-d upon which the present technology may execute. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage, and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of users may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End users may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402*a-d*. The server computers 402*a-d* may also be known as physical hosts. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e. a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine manager (VMM), or another type of program configured to enable the execution of multiple computing instances 404*a-d* on a single server. Additionally, each of the computing instances 404*a-d* may be configured to execute one or more applications.

A server computer 414 may be reserved to execute software components for implementing the present technology or managing the operation of the computing service 400 and the computing instances 404*a-d*. For example, the server computer 414 may execute an application orchestration service 415*a* to perform edge computing management with multiple latency options.

A server computer 416 may execute a management component 418. A user may access the management component 418 to configure various aspects of the operation of the computing instances 404*a-d* purchased by a user. For example, the user may setup computing instances 404*a-d* and make changes to the configuration of the computing instances 404*a-d*.

A deployment component 422 may be used to assist users in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a user that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache is to be prepared, and other types of information. The deployment component 422 may utilize the user-provided configuration and cache logic to configure, prime, and launch computing instances 404*a-d*. The configuration, cache logic, and other information may be specified by a user accessing the management component 418 or by providing this information directly to the deployment component 422.

Customer account information 424 may include any desired information associated with a user of the multi-tenant environment. For example, the customer account information 424 may include a unique identifier for a user, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end users may access the computing service 400. In addition, the network 410 may include a virtual network overlaid on the physical network to provide communications between the server computers 402*a-d*. The network topology illustrated in FIG. 4 has been simplified, as many more networks and networking devices may be utilized to interconnect the various computing systems disclosed herein.

Figure 5:
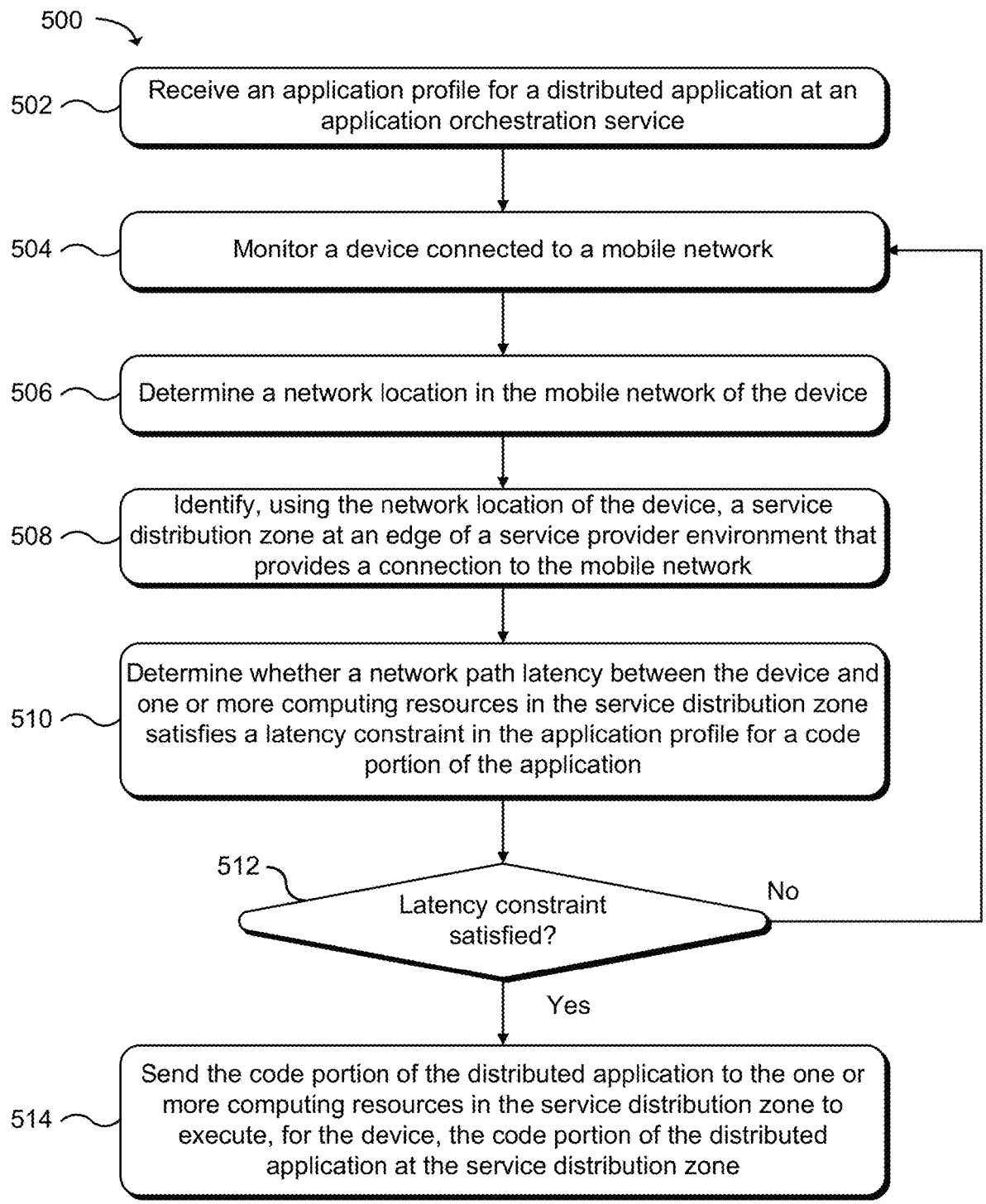
FIG. 5 is a flow diagram that illustrates an example method for orchestrating, using an application orchestration service, the execution of application processing by a code portion of a distributed application located in a service distribution zone using an application profile according to one example of the present technology.

FIG. 5 is a flow diagram that illustrates an example method for orchestrating application processing by a code portion of a distributed application at a service distribution zone using a latency constraint for the code portion of the distributed application according to one example of the present technology. The method 500 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 502, an application orchestration service may receive an application profile associated with a distributed application. The application profile may specify a latency constraint for one or more portions of the distributed application. The one or more portions of the distributed application may be executable across different service distribution zones. The latency constraint may indicate a predefined latency, a latency range, an upper or lower threshold, and the like which a given portion of the distributed application is desired to tolerate. The latency constraint may correspond to an average, frequent, or typical latency offered between computing resources of a service distribution zone and connections to available networks, such a wired, wireless, fixed, and mobile networks.

In operation 504, the application orchestration service may monitor a device connected to a mobile network. For example, the application orchestration service may query the mobile network for the network location of the device. The application orchestration service may determine the last-mile link location of the device, and the application orchestration service may also optionally determine the geographic location of the device. In operation 506, the application orchestration service may determine a network location of the device.

In operation 508, the application orchestration service may identify, using the network location, a service distribution zone at an edge of a service provider environment that provides a connection to the mobile network. The application orchestration service may identify a service distribution zone closest physically to the network location of the device. In another example, the application orchestration service may identify a service distribution zone having the fastest connection to the mobile network where the device is connected.

In operation 510, the application orchestration service may determine whether a network path latency between the device and one or more computing resources of the service distribution zone satisfies a latency constraint for the code portion of the distributed application used by the device. For example, the application orchestration service may determine whether the latency between computing resources at a colocation site to the mobile network and the device satisfies the latency constraint for the code portion of the distributed application. The latency between the computing resources at the colocation site and the device may be less than or within the latency constraint for the code portion of the distributed application. The application orchestration service may also determine whether a measured latency between computing resources and a low-latency link to the device is less than or fails within the latency constraint.

If the latency constraint is not satisfied in operation 512, the method 500 continues monitoring in operation 504. If the latency constraint is satisfied, in operation 514, the application orchestration service may send the code portion of the distributed application to the one or more computing resources of the service distribution zone to execute, for the device, the application processing by the code portion of the distributed application within the service distribution zone. In one example, the application orchestration service may send an instruction to the one or more computing resources of the service distribution zone to execute, for the device, the application processing by the code portion of the distributed application within the service distribution zone, for example, when a copy of the code portion of the distributed application is already present at service distribution zone.

According to one example of the present technology, the application orchestration service may match portions of the distributed application to service distribution zones using the application profile. Upon application startup, the application orchestration service may send one or more portions of the distributed application to one or more computing resources of various service distribution zones to execute, for the device, the application processing by the code portion of the distributed application within the given service distribution zone. The application orchestration service may initialize the distributed application across service distribution zones according to whether the given service distribution zone satisfies the latency constraints of corresponding portions of the distributed application.

According to another example of the present technology, the application orchestration service may migrate portions of the distributed application between service distribution zones using the application profile. During application execution, the application orchestration service may send an instruction to one or more computing resources of various service distribution zones to migrate the application processing using the code portion of the distributed application from one service distribution zone to another. The application orchestration service may migrate portions of the distributed application between service distribution zones according to whether the current service distribution zone satisfies the latency constraints of corresponding portions of the distributed application.

Figure 6:
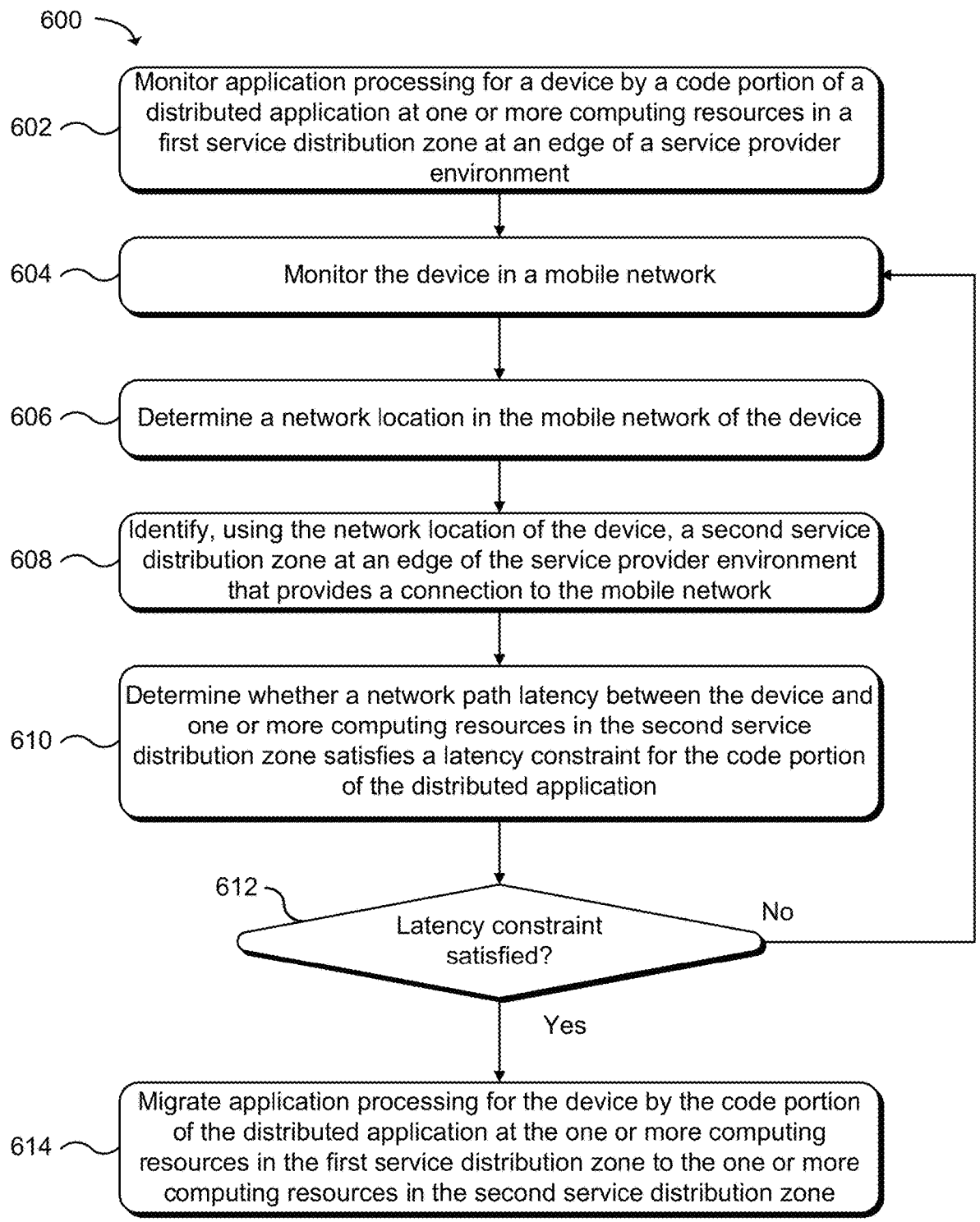
FIG. 6 is a flow diagram that illustrates an example method for migrating, using an application orchestration service, the execution of application processing performed by a code portion of a distributed application between service distribution zones of a service provider environment according to one example of the present technology.

FIG. 6 is a flow diagram that illustrates an example method for migrating application processing for a code portion of a distributed application between service distribution zones according to one example of the present technology. The method 600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 602, an application orchestration service may monitor application processing for a device by a code portion of a distributed application at one or more computing resources at a first service distribution zone at an edge of a service provider environment. The application orchestration service may track which resources within the service distribution zone are allocated to the application processing by the code portion of the distributed application for the device. The application orchestration service may further track what data within the service distribution zone is used by the application processing by the code portion of the distributed application for the device.

In operation 604, the application orchestration service may monitor the device connected to a mobile network. For example, the application orchestration service may query the mobile network for a change in the network location of the device. The application orchestration service may determine the last-mile link location of the device, and the application orchestration service may also determine the geographic location of the device. In operation 606, the application orchestration service may determine the network location of the device.

In operation 608, the application orchestration service may identify, using the network location, a second service distribution zone at an edge of the service provider environment that provides a connection to the mobile network. The application orchestration service may identify the second service distribution zone as the closest service distribution zone physically to the network location of the device. In another example, the application orchestration service may identify the second service distribution zone as a service distribution zone having the fastest connection to the mobile network.

In operation 610, the application orchestration service may determine whether a network path latency between the device and one or more computing resources of the second service distribution zone satisfy a latency constraint for the code portion of the distributed application used by the device. For example, the application orchestration service may determine whether the latency between computing resources at a colocation site of the mobile network and the device satisfies the latency constraint by being less than or within a predetermined threshold. The application orchestration service may also determine whether a measured latency between computing resources and a low-latency link to the device is above or below the latency constraint.

If the latency constraint is not satisfied in operation 612, the method 600 continues monitoring in operation 604. If the latency constraint is satisfied, in operation 614, the application orchestration service may migrate application processing for the device by the code portion of the distributed application at the one or more computing resources in the first service distribution zone to the one or more computing resources in the second service distribution zone. The application orchestration service may send the code portion of the distributed application to the one or more computing resources of the second service distribution zone to execute, for the device, the application processing by the code portion of the application within the second service distribution zone. The application orchestration service may optionally send an instruction to the one or more computing resources of the second service distribution zone to handle, for the device, the application processing by the code portion of the distributed application within the second service distribution zone if the code portion of the application is already present at the second service distribution zone.

According to one example of the present technology, the application orchestration service may retrieve application data associated with the device from the one or more computing resources of the first service distribution zone and send the application data to the one or more computing resources of the second service distribution zone. The application orchestration service may send an instruction to the one or more computing resources of the first service distribution zone to transfer the application data associated with the device to the one or more computing resources of the second service distribution zone. The application orchestration service may also send an instruction to the one or more computing resources of the first service distribution zone to terminate the application processing for the device within the first service distribution zone.

Figure 7:
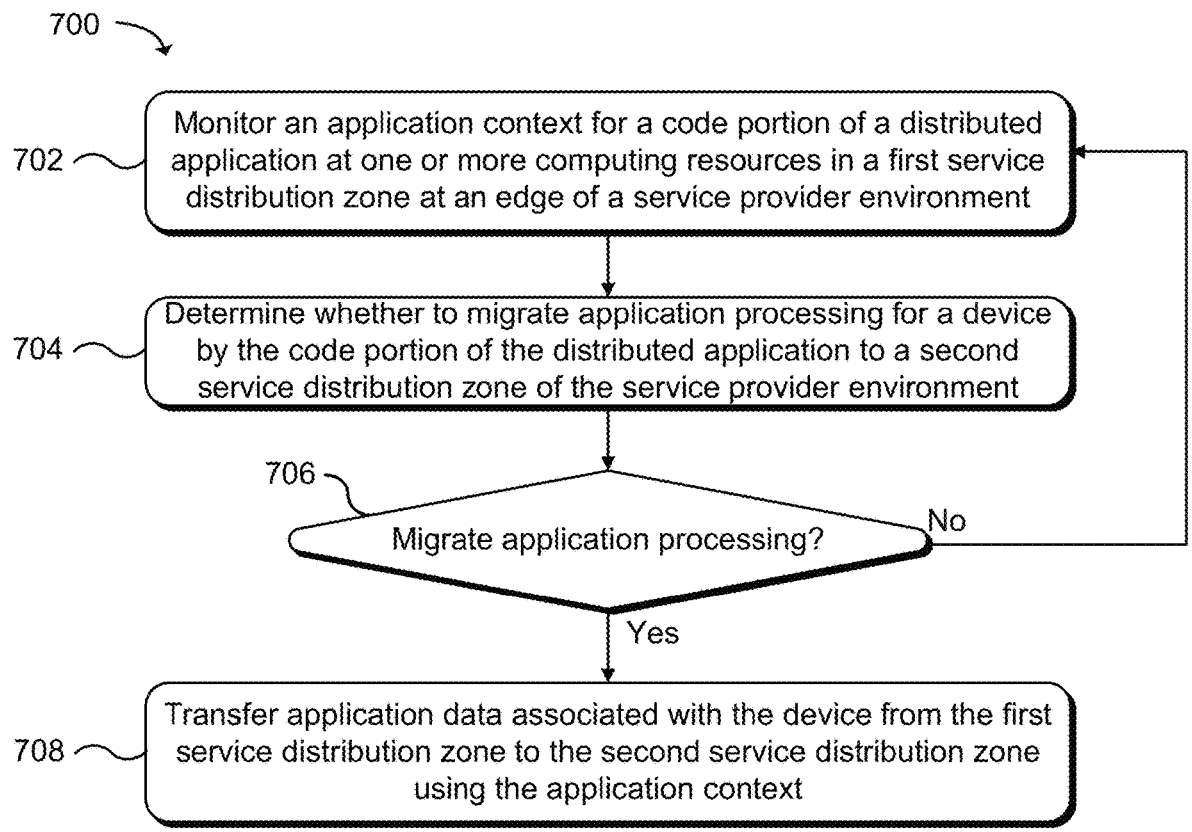
FIG. 7 is a flow diagram that illustrates an example method for monitoring, using an application orchestration service, the execution of application processing performed by a code portion of a distributed application at a first service distribution zone to transfer application data associated with a device to a second service distribution zone according to one example of the present technology.

FIG. 7 is a flow diagram that illustrates an example method for monitoring application processing by a code portion of a distributed application at a service distribution zone to transfer application data associated with a device according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, an application orchestration service may monitor an application context for a code portion of a distributed application at one or more computing resources in a first service distribution zone at an edge of a service provider environment. The application orchestration service may track which resources within the service distribution zone are allocated to the application processing for the code portion of the distributed application for the device. The application orchestration service may further track what data within the service distribution zone is used by the application processing by the code portion of the distributed application for the device.

In operation 704, the application orchestration service may determine whether to migrate application processing for a device by the code portion of the distributed application to a second service distribution zone of the service provider environment. The application orchestration service may migrate the application processing for the device between the first and the second service distribution zone in response to a variety of conditions. For example, the application orchestration service may migrate the application processing for the device between service distribution zones in response to a change in a network path latency, a change in network location of the device, a change in computing resource capacity, a change in processing, network traffic congestion, and the like.

According to one example of the present technology, the application orchestration service may determine to migrate the application processing for the device from one service distribution zone to another service distribution zone in response to physical movement of the device. The application orchestration service may migrate the application processing from one near-client service distribution zone formerly having a last mile link to the device to another near-client service distribution zone currently having a last mile link to the device in order to follow the device in the real world. The application orchestration service may query the mobile network to determine a network location of the device. The application orchestration service may identify the service distribution zone with a connection to the mobile network that satisfies the latency constraint for the code portion of the distributed application.

According to another example of the present technology, the application orchestration service may determine to migrate the application processing for the device from one service distribution zone to another service distribution zone in response to changes in a network path latency between the device and one or more computing resources that provide the application processing. The application orchestration service may detect changes in the network path latency and migrate the application processing between service distribution zones to ensure that the latency constraint for the code portion of the distributed application is satisfied. The application orchestration service may detect when a connection is established or disconnected and migrate the application processing between service distribution zones.

If a determination is made to migrate the application processing in operation 706, the application orchestration service may transfer application data associated with the device from the first service distribution zone to the second service distribution zone using the application context. In one example, the application orchestration service may request the application data from one or more computing resources of the first service distribution zone. The application orchestration service may then send the application data to one or more computing resources of the second service distribution zone. In another example, the application orchestration service may instruct the one or more computing resources of the first service distribution zone to transfer the application data to the one or more computing resources of the second service distribution zone.

Figure 8:
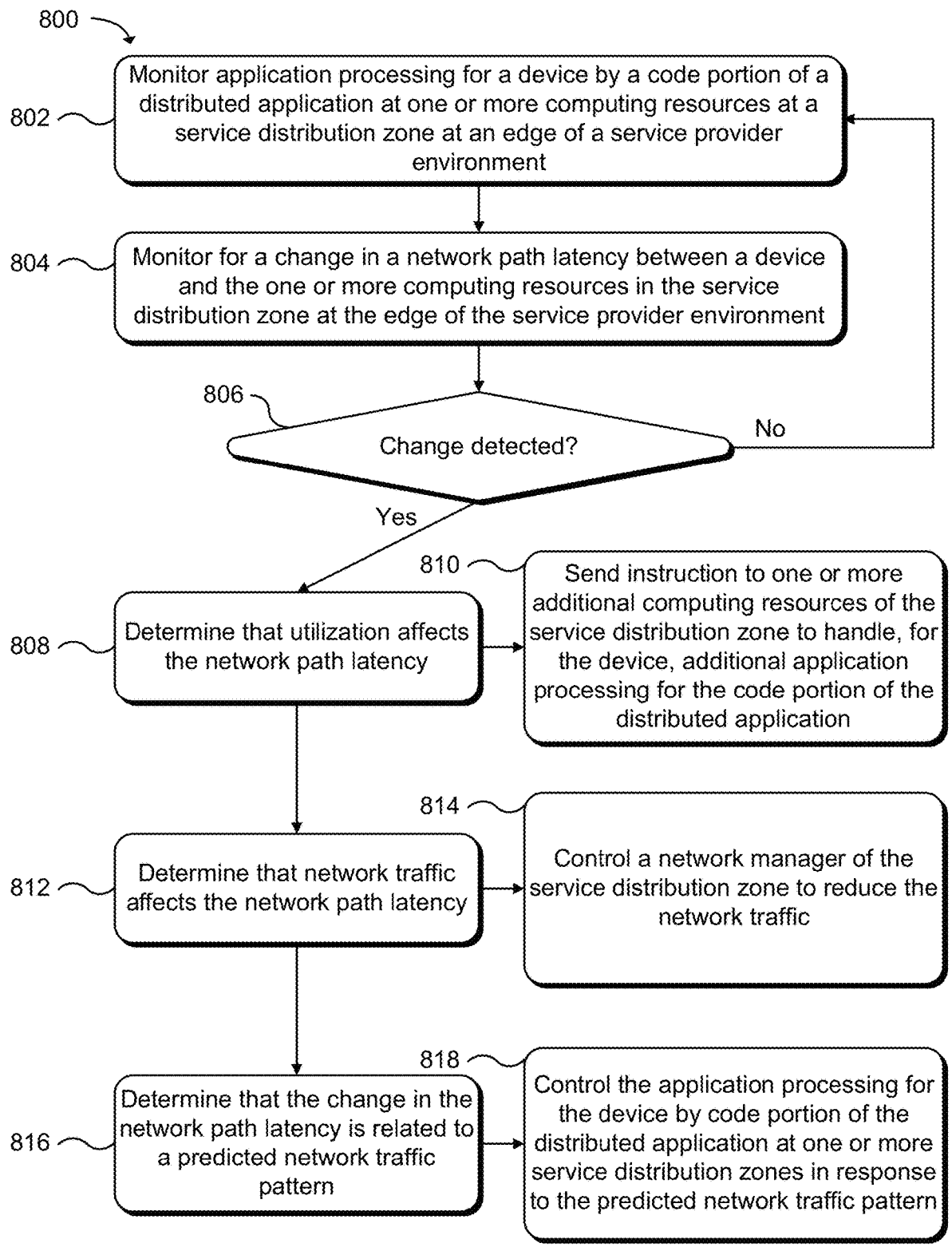
FIG. 8 is a flow diagram that illustrates an example method for monitoring, using an application orchestration service, the execution of application processing performed by a code portion of a distributed application at a service distribution zone for changes in a network path latency to ensure that a latency constraint for the code portion of the distributed application is met according to one example of the present technology.

FIG. 8 is a flow diagram that illustrates an example method 800 for monitoring application processing by a code portion of a distributed application at a service distribution zone for changes in a network path latency according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 802, an application orchestration service may monitor application processing for a device by a code portion of a distributed application at one or more computing resources in a service distribution zone at an edge of a service provider environment. The application orchestration service may track which resources within the service distribution zone are allocated to the application processing by the code portion of the distributed application for the device. The application orchestration service may further track what data within the service distribution zone is used by the application processing by the code portion of the distributed application for the device.

In operation 804, the application orchestration service may monitor for a change in a network path latency between the device and the one or more computing resources in the service distribution zone providing the application processing. The application orchestration service may actively track ping times, round trip times, request-response times, and the like that may affect the network path latency. The application orchestration service may also track network traffic, congestion, application processing, and the like that may indirectly affect the network path latency. According to one example of the present technology, the application orchestration service may integrate with the mobile network to determine a change in a network location of the device that may affect the network path latency.

In operation 806, the application orchestration service may determine whether a change in the network path latency had been detected. If no change in the network path latency is detected, the application orchestration service may continue monitoring in operation 802. If a change in the network path latency is detected, the application orchestration service may perform one or more actions to ensure that a latency constraint associated with the code portion of the distributed application used by the device is satisfied.

For example, in operation 808, the application orchestration service may determine that utilization of the one or more computing resources at the service distribution zone affects the network path latency. The application orchestration service may determine that the utilization of the one or more computing resources at the service distribution zone negatively affects the network path latency thereby increasing the latency. An increase in capacity associated with the application processing for the code portion of the distributed application within the service distribution zone may ensure that the latency constraint associated with the code portion of the distributed application used by the device is satisfied. Specifically, additional computing resources may improve the responsiveness of the application processing. In operation 810, the application orchestration service may send an instruction to one or more additional computing resources of the service distribution zone to perform additional application processing for the code portion of the distributed application within the service distribution zone. Additionally, the application orchestration service may send the code portion of the distributed application an instruction to the one or more additional computing resources of the service distribution zone to perform the additional application processing within the service distribution zone. The additional computing resources may improve the responsiveness of the application processing for all devices.

In operation 812, the application orchestration service may determine that network traffic in the service distribution zone affects the network path latency. The application orchestration service may determine that network traffic in the service distribution zone negatively affects the network path latency and increases the latency. The application orchestration service may monitor network traffic within one or more service distribution zones to identify network traffic congestion that may affect the network path latency. In operation 814, the application orchestration service may control a network manager of the service distribution zone to reduce the network traffic. The application orchestration service may instruct the network manager to reroute network traffic congestion or redirect network traffic to ensure that the latency constraint associated with the code portion of the distributed application used by the device is satisfied. In another example, the application orchestration service may instruct the network manager to define a quality of service giving priority to the network traffic associated with the device.

In another example, in operation 816, the application orchestration service may determine that the change in the network path latency is related to a predicted network traffic pattern. The application orchestration service may monitor network traffic within one or more service distribution zones to identify network traffic patterns for the device (or similar devices). The application orchestration service may then predict when and where network traffic is likely to occur due to historic application processing by the code portion of the distributed application. In operation 818, the application orchestration service may control the application processing for the device by code portion of the distributed application at one or more service distribution zones in response to the predicted network traffic pattern. The application orchestration service may manage the application processing for the code portion of the distributed application within the service distribution zone in response to the predicted network traffic. In one example, the application orchestration service may predict an increase in network traffic and a resulting amount of processing due to the change in the network path latency. The application orchestration service may increase the number of computing resources to handle, for the device, any expected or additional application processing. The application orchestration service may also decrease the number of computing resources as needed. In another example, the application orchestration service may anticipate the number of computing resources for the application processing needed for the code portion of the distributed application within a given service distribution zone based on the time of day, day of the week, etc. by predicting the network traffic pattern. In yet another example, the application orchestration service may anticipate the application processing for the code portion of the distributed application to follow a path through a series of service distribution zones as the device travels in the physical environment.

Accordingly, the application orchestration service may orchestrate when and where portions of the distributed application are assigned to particular service distribution zones to ensure that the latency constraints are satisfied. The application orchestration service may dynamically migrate all or part of a distributed application between service distribution zones due to changes in network path latency, network traffic, service distribution zone capacity, and the like in order to satisfy the latency constraints.

Figure 9:
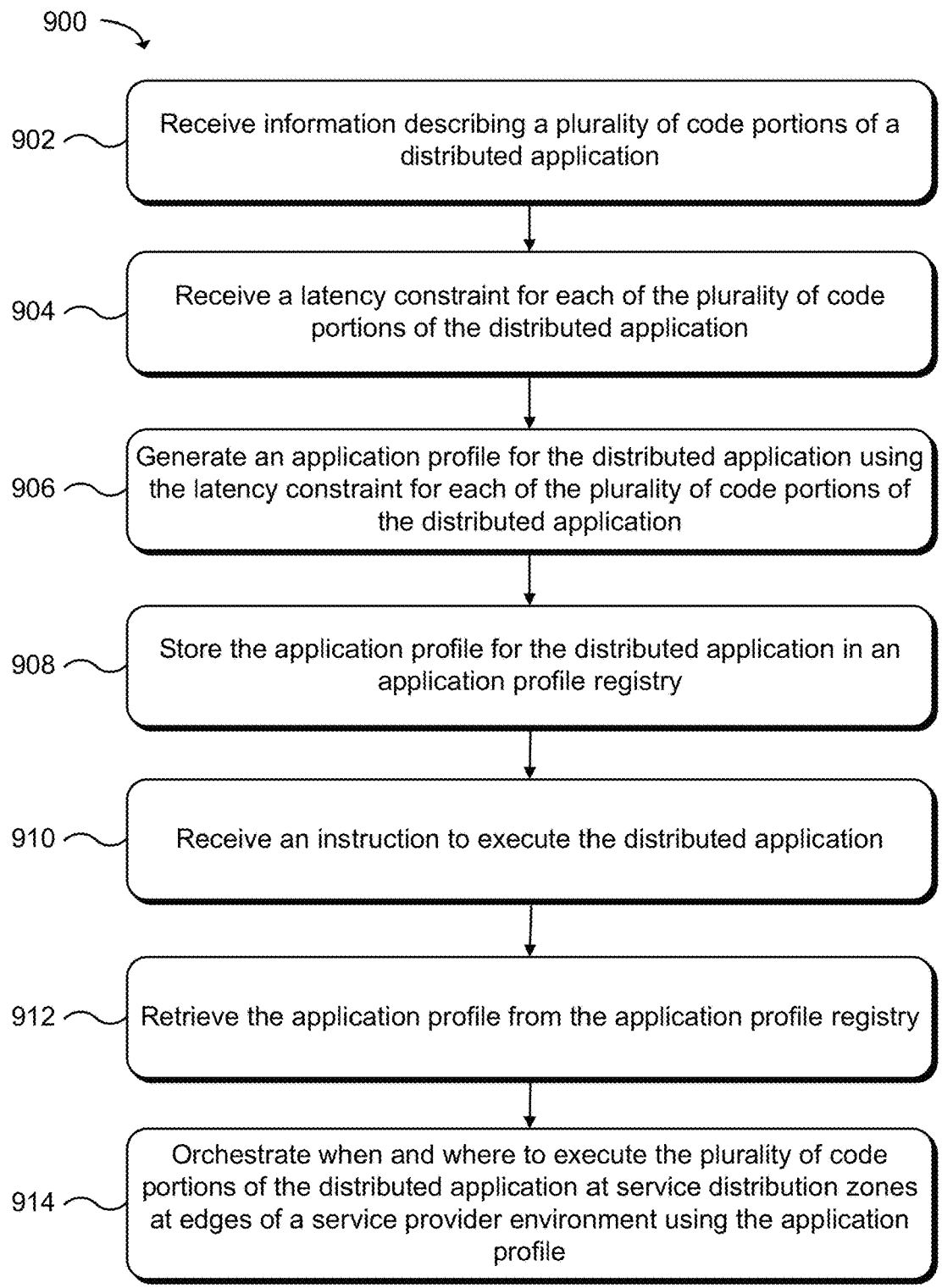
FIG. 9 is a flow diagram that illustrates an example method for storage and retrieval of an application profile for a distributed application having multiple latency constraints according to one example of the present technology.

FIG. 9 is a flow diagram that illustrates an example method 900 for storage and retrieval of an application profile for a distributed application having multiple latency constraints according to one example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

A service provider environment may include an application development service that enables accounts to create and test distributed applications. A developer may utilize an integrated development environment (IDE) of the application development service to code, test, and deploy applications. The developer may utilize an edge application profile designer module of the IDE to create an application profile for a distributed application.

In operation 902, the edge application profile designer may receive information describing a plurality of portions of a distributed application. The developer may use the edge application profile designer to describe code blocks, functions, subroutines, code modules, and like of the distributed application for independent execution at a service distribution zone of the service provider environment. In operation 904, the edge application profile designer may receive a latency constraint for each of the plurality of portions of the distributed application. For example, the developer may specify a latency, a latency range, a latency threshold, etc. for each portion of the application. The developer may select a latency constraint from among a plurality of predefined latency options available within the service provider environment.

In operation 906, the edge application profile designer may generate an application profile for the distributed application using the latency constraint for each of the plurality of portions of the distributed application. The edge application profile designer may generate the application profile as a document, such as an extensible markup language (XML) document or a JavaScript Object Notation (JSON) document. The edge application profile designer may generate the application profile for the entire distributed application. In another example, the edge application profile designer may generate multiple individual application profiles or each portion of the distributed application having a latency constraint. In operation 908, the edge application profile designer may store the application profile for the distributed application in an application profile registry. The application profile registry may include a database of application profiles. The edge application profile designer may store the application profile in the application profile registry using an identifier, such as an alpha numeric value or hash value.

In operation 910, an application orchestration service hosted by the service provider environment may receive an instruction to execute the distributed application. The application orchestration service may receive the instruction in response to an initial invocation of the distributed application. In another example, the application orchestration service may receive the instruction in response to instantiating a portion of the distributed application for a specific device.

In operation 912, the application orchestration service may retrieve the application profile for the distributed application from the application profile registry. The application orchestration service may retrieve the application profile using an identifier, such as a globally unique identifier (GUID). The application orchestration service may retrieve the application profile using a hash corresponding to a portion of the distributed application to be executed.

In operation 914, the application orchestration service may instantiate the plurality of portions of the distributed application across service distribution zones using the application profile. In one example, the application orchestration service may instantiate a first portion of the distributed application within a first service distribution zone using the application profile. The first service distribution zone may provide an average or typical latency of 100 ms. The latency constraint in the application profile for the first portion of the distributed application may be satisfied by the average or typical latency offered within the first service distribution zone. In another example, the application orchestration service may instantiate a second portion of the distributed application within a second service distribution zone using the application profile. The first service distribution zone may provide an average or typical latency of 10 to 20 ms. The latency constraint in the application profile for the second portion of the distributed application may be satisfied by the average or typical latency offered within the second service distribution zone.

Accordingly, the application orchestration service may match portions of the distributed application to particular service distribution zones that satisfy the latency constraints specified in the application profile. The application orchestration service may dynamically migrate all or part of a distributed application between service distribution zones due to changes in network path latency, network traffic, service distribution zone capacity, and the like in order to satisfy the latency constraints.

In one example of the present technology, the processing performed by the application orchestration service may be included in the portions of the distributed application. A code module of the distributed application may dynamically track latency using a constraint for how fast a job should get finished to be responsive. The code module may independently request migration between service distribution zones from the application orchestration service in order to satisfy the latency constraint.

Figure 10:
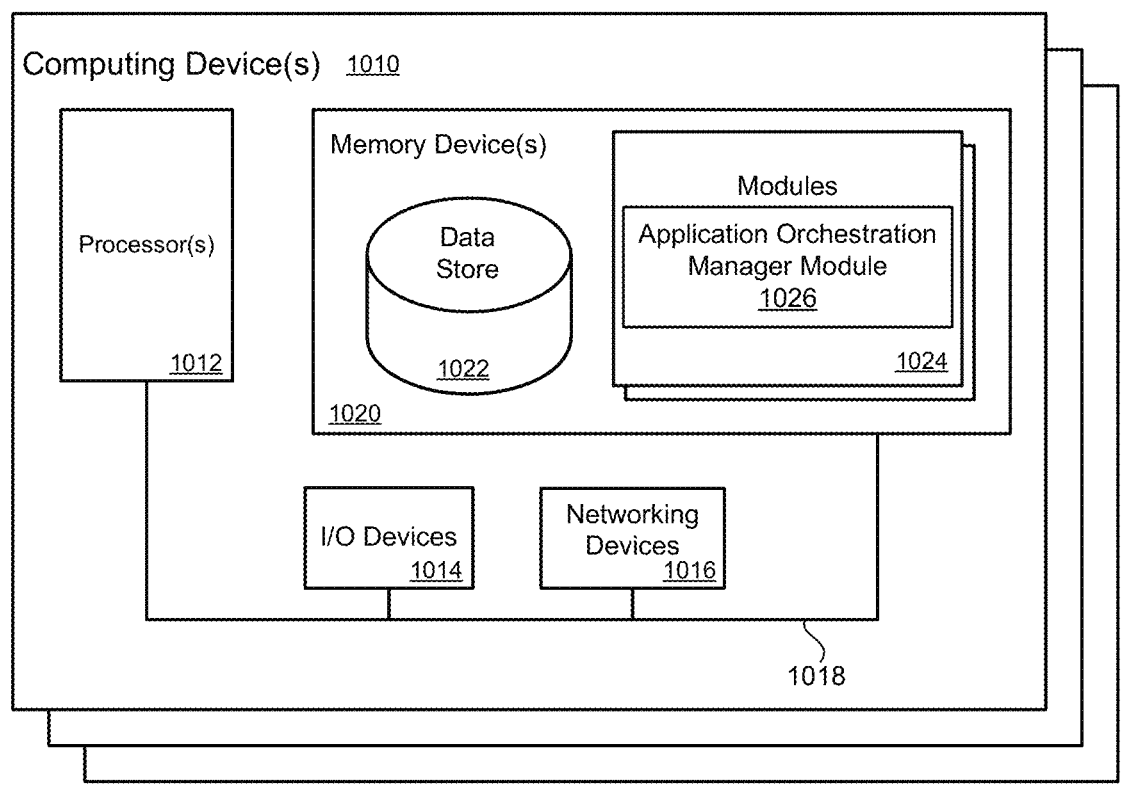
FIG. 10 illustrates one or more computing device(s) on which modules or code components of this technology may execute.

FIG. 10 illustrates one or more computing device(s) 1010 on which modules or code components of this technology may execute. A first computing device 1010 is illustrated on which a high-level example of the technology may be executed. The first computing device 1010 may include one or more processor(s) 1012 that are in communication with memory device(s) 1020. The computing device may include a local communication interface 1018 for the components in the computing device. For example, the local communication interface may be a local data bus and/or any related address or control busses as may be desired.

The memory device(s) 1020 may contain modules 1024 or code components that are executable by the processor(s) 1012 and data for the modules 1024. The modules 1024 may execute the functions described earlier. In this example, the memory device(s) 1020 include an application orchestration manager module 1026 operable to manage edge computing with multiple latency options.

A data store 1022 may also be located in the memory device(s) 1020 for storing data related to the modules 1024 and other applications along with an operating system that is executable by the processor(s) 1012. Other applications may also be stored in the memory device(s) 1020 and may be executable by the processor(s) 1012. Components or modules discussed in this description that may be implemented in the form of software using high programming level languages that are compiled, interpreted, or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. The networking devices 1016 and similar communication devices may be included in the computing device. The networking devices 1016 may be wired or wireless networking devices that connect to the internet, a LAN, WAN, or other computing network.

The components or modules that are shown as being stored in the memory device(s) 1020 may be executed by the processor(s) 1012. The term "executable" may mean a program file that is in a form that may be executed by a processor(s) 1012. For example, a program in a higher-level language may be compiled into machine code in a format that may be loaded into a random-access portion of the memory device(s) 1020 and executed by the processor(s) 1012, or source code may be loaded by another executable program and interpreted to generate instructions in a random access portion of the memory to be executed by a processor. The executable program may be stored in any portion or component of the memory device(s) 1020. For example, the memory device(s) 1020 may be random access memory (RAM), read only memory (ROM), flash memory, a solid-state drive, memory card, a hard drive, optical disk, floppy disk, magnetic tape, or any other memory components.

The processor(s) 1012 may represent multiple processors and the memory 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   a processor; and
   a memory to store instructions which when executed by the processor cause the processor to:

receive, at an application orchestration service hosted by a service provider environment, an application profile for a distributed application to be instantiated across computing resources within a service provider environment, wherein the application profile is generated using latency constraints received for a plurality of code portions of the distributed application to be dynamically assigned across the computing resources;

send an instruction to one or more computing resources in a first service distribution zone at a first edge of the service provider environment to execute, for a device connected to the distributed application via a network, a first code portion and a second code portion of the distributed application at the first service distribution zone based on the latency constraints received for the first code portion and the second code portion of the distributed application and based on a first network location of the device in the network;

receive an indication that the device has moved from the first network location to a second network location in the network;

determine whether a network path latency between the device at the second network location and one or more computing resources in a second service distribution zone at a second edge of the service provider environment satisfies the latency constraints received for the first code portion and the second code portion of the distributed application; and send, using the application orchestration service, an instruction to the one or more computing resources in the second service distribution zone at the second edge of the service provider environment to execute, for the device, at least one of the first code portion or the second code portion of the distributed application at the second service distribution zone based on the network path latency satisfying the latency constraint for the first code portion or the second code portion of the distributed application.

2. The system of claim 1, wherein the instructions further cause the processor to:

migrate, using the application orchestration service, application data used by the first code portion or the second code portion of the distributed application at the first service distribution zone to the one or more computing resources in the second service distribution zone based on the network path latency satisfying the latency constraints received for the first code portion or the second code portion of the distributed application.

3. The system of claim 1, wherein the instructions further cause the processor to:

monitor utilization of the one or more computing resources in the second service distribution zone;

determine whether the utilization of the one or more computing resources in the second service distribution zone negatively affects the network path latency between the device at the second network location and the one or more computing resources in the second service distribution zone; and send, from the application orchestration service, an instruction to one or more additional computing resources in the second service distribution zone to provide, for the device, additional application processing capacity for the first code portion or the second code portion of the distributed application at the second service distribution zone when the utilization of the one or more computing resources in the second service distribution zone negatively affects the network path latency between the device at the second network location and the one or more computing resources in the second service distribution zone.

4. The system of claim 1, wherein the instructions further cause the processor to:

monitor network traffic in the second service distribution zone;

determine whether the network traffic negatively affects the network path latency between the device at the second network location and the one or more computing resources in the second service distribution zone; and send, from the application orchestration service, an instruction to a network manager of the second service distribution zone to reduce network traffic congestion when the network traffic negatively affects the network path latency between the device at the second network location and the one or more computing resources in the second service distribution zone.

5. The system of claim 1, wherein the instructions further cause the processor to:

determine, using the application orchestration service, whether to execute, for the device, the first code portion or the second code portion of the distributed application at the second service distribution zone based on predicting a network traffic pattern from historic network traffic at the second service distribution zone; and pre-load application data associated with the device for the first code portion or the second code portion of the distributed application at the second service distribution zone based on the network traffic pattern.

6. A method, comprising:

receiving a first network location of a first device in a network, wherein the first device is configured to use an application hosted by a service provider environment;

identifying, using the first network location of the first device, a first service distribution zone, at a first edge of the service provider environment, that provides a connection between the network and a first computing resource in the first service distribution zone capable of executing a plurality of code portions of the application;

determining, using an application orchestration service, whether a first network path latency between the first device at the first network location and the first computing resource satisfies one or more latency constraints for the plurality of code portions of the application, wherein the one or more latency constraints are indicated in an application profile that is generated using latency constraints received for the plurality of code portions of the distributed application to be dynamically assigned across one or more computing resources associated with the service provider environment; and sending, from the application orchestration service, an instruction to the first computing resource to execute, for the first device, the plurality of code portions of the application at the first service distribution zone based on the first network path latency satisfying the one or more latency constraints for the plurality of code portions of the application.

7. The method of claim 6, further comprising:

receiving a second network location of the first device in the network;

identifying, using the second network location of the first device, a second service distribution zone at a second edge of the service provider environment that provides a connection between the network and a second computing resource in the second service distribution zone capable of executing the plurality of code portions of the application;

determining whether a second network path latency between the first device at the second network location and the second computing resource satisfies the one or more latency constraints for the plurality of code portions of the application; and migrating, using the application orchestration service, application processing performed by the plurality of code portions of the application at the first computing resource in the first service distribution zone to the second computing resource in the second service distribution zone based on the second network path latency satisfying the one or more latency constraints for the plurality of code portions of the application.

8. The method of claim 6, further comprising:

determining whether to migrate application processing performed by the plurality of code portions of the application at the first computing resource in the first service distribution zone to a second computing resource in a second service distribution zone of the service provider environment when the first network path latency no longer satisfies the one or more latency constraints for the plurality of code portions of the application; and migrating, using the application orchestration service, the application processing performed by the plurality of code portions of the application at the first computing resource in the first service distribution zone to the second computing resource in the second service distribution zone based on the first network path latency no longer satisfying the one or more latency constraints for the plurality of code portions of the application.

9. The method of claim 6, further comprising:

determining whether to migrate application processing performed by the plurality of code portions of the application at a second computing resource in a second service distribution zone of the service provider environment to the first computing resource of the first service distribution zone when a connection between the first device and the network is established; and migrating, using the application orchestration service, the application processing performed by the plurality of code portions of the application at the second computing resource in the second service distribution zone to the first computing resource in the first service distribution zone based on the connection between the first device and the network being established.

10. The method of claim 6, further comprising:

monitoring utilization of the first computing resource in the first service distribution zone;

determining whether the utilization of the first computing resource negatively affects the network path latency between the first device and the first computing resource; and sending, from the application orchestration service, an instruction to a second computing resource in the first service distribution zone to execute, for the first device, the plurality of code portions of the application at the first service distribution zone when the utilization of the first computing resource negatively affects the network path latency between the first device and the first computing resource.

11. The method of claim 6, further comprising:

receiving a second network location of a second device in the network, wherein the second device is configured to use the application hosted by the service provider environment;

determining whether a second network path latency between the second device and the first computing resource satisfies the one or more latency constraints for the plurality of code portions of the application; and sending, from the application orchestration service, an instruction to the first computing resource to execute, for the second device, the plurality of code portions of the application at the first service distribution zone based in part on the second network path latency satisfying the one or more latency constraints for the plurality of code portions of the application.

12. The method of claim 6, further comprising:

receiving a network traffic pattern predicted from network traffic information associated with application processing performed by the plurality of code portions of the application at one or more computing resources of one or more service distribution zones of the service provider environment; and sending, from the application orchestration service, the instruction to the first computing resource to execute, for the first device, the plurality of code portions of the application at the first service distribution zone based on the predicted traffic pattern.

13. The method of claim 6, further comprising:

receiving an indication of network traffic congestion at the first service distribution zone affecting the first network path latency; and controlling, using the application orchestration service, a network manager of the first service distribution zone to reduce the network traffic congestion at the first service distribution zone affecting the first network path latency.

14. The method of claim 6, further comprising:

identifying a second service distribution zone of the service provider environment at a data center or a mid-point service distribution zone at a colocation facility that provides a connection between the network and a second computing resource in the second service distribution zone or the mid-point service distribution zone capable of executing additional code portions of the application;

determining whether a second network path latency between the first device and the second computing resource satisfies latency constraints for the additional code portions of the application when used by the first device; and sending, from the application orchestration service, an instruction to the second computing resource to execute, for the first device, at least one of the additional code portions of the application at the second service distribution zone or the mid-point service distribution zone based on the second network path latency satisfying the latency constraint for the at least one of the additional code portions of the application.

15. The method of claim 6, further comprising:

querying the network for a last-mile link associated with the first device;

determining the first network location in the network of the first device using the last-mile link associated with the first device; and identifying a near-client service distribution zone as the first service distribution zone using the first network location.

16. The method of claim 6, further comprising:

receiving, for the application, the application profile providing the one or more latency constraints for the plurality of code portions of the application; and determining the one or more latency constraints for the plurality of code portions of the application using the application profile.

17. A non-transitory computer-readable medium storing instructions which when executed by a processor of a computer system cause the processor to:

receive, at an application orchestration service hosted by a service provider environment, an application profile for a distributed application, wherein the application profile is generated using a respective latency constraint received for individual code portions of the distributed application to be dynamically assigned across one or more computing resources;

determine whether a network path latency between a device at a network location in a network and the one or more computing resources in a first service distribution zone at an edge of the service provider environment satisfies one or more latency constraints in the application profile for a plurality of code portions of the distributed application;

send the plurality of code portions of the distributed application to the one or more computing resources in the first service distribution zone at the edge of the service provider environment to execute, for the device, the plurality of code portions of the distributed application at the first service distribution zone based on the network path latency satisfying the one or more latency constraints for the plurality of code portions of the distributed application; and migrate, using the application orchestration service, application processing by the plurality of code portions of the distributed application at one or more computing resources in a second service distribution zone of the service provider environment to the one or more computing resources in the first service distribution zone at the edge of the service provider environment.

18. The non-transitory computer-readable medium of claim 17, wherein the instructions further cause the processor to:

monitor utilization of the one or more computing resources in the first service distribution zone;

determine whether the utilization of the one or more computing resources in the first service distribution zone negatively affects the network path latency between the device and the one or more computing resources in the first service distribution zone; and send, from the application orchestration service, an instruction to one or more additional computing resources in the first service distribution zone to execute, for the device, the plurality of code portions of the distributed application at the first service distribution zone.

19. The non-transitory computer-readable medium of claim 17, wherein the instructions further cause the processor to:

monitor network traffic in the first service distribution zone;

determine whether the network traffic in the first service distribution zone negatively affects the network path latency between the device and the one or more computing resources in the first service distribution zone; and send, from the application orchestration service, an instruction to a network manager of the first service distribution zone to control the network traffic when the network traffic in the first service distribution zone negatively affects the network path latency between the device and the one or more computing resources in the first service distribution zone.

20. The non-transitory computer-readable medium of claim 17, wherein the instructions further cause the processor to:

determine, using the application orchestration service, whether to migrate the application processing by the plurality of code portions of the distributed application at the one or more computing resources in the second service distribution zone of the service provider environment to the one or more computing resources in the first service distribution zone at the edge of the service provider environment based on predicting a network traffic pattern from historic network traffic of the first service distribution zone; and migrate, using the application orchestration service, the application processing by the plurality of code portions of the distributed application at the one or more computing resources in the second service distribution zone of the service provider environment to the one or more computing resources in the first service distribution zone at the edge of the service provider environment based on the network traffic pattern.

* * * * *